(12) United States Patent
Crutchley et al.

(10) Patent No.: US 8,444,356 B2
(45) Date of Patent: May 21, 2013

(54) BLIND STUD INSERT

(75) Inventors: Derek Crutchley, Warrington (GB); Philip Wasmuth, Welwyn Garden City (GB); Jonathan Brewer, Bedfordshire (GB)

(73) Assignee: Avdel UK Limited, Welwyn Garden, Hertfordshire (GB)

( * ) Notice: Subject to any disclaimer, the term of this patent is extended or adjusted under 35 U.S.C. 154(b) by 311 days.

(21) Appl. No.: 12/517,687

(22) PCT Filed: Nov. 9, 2007

(86) PCT No.: PCT/GB2007/004275
§ 371 (c)(1),
(2), (4) Date: Jul. 7, 2009

(87) PCT Pub. No.: WO2008/074974
PCT Pub. Date: Jun. 26, 2008

(65) Prior Publication Data
US 2010/0068002 A1   Mar. 18, 2010

(30) Foreign Application Priority Data
Dec. 20, 2006  (GB) .................................. 0625438.7

(51) Int. Cl.
  F16B 39/00  (2006.01)
  F16B 39/28  (2006.01)
  F16B 39/34  (2006.01)
  F16B 13/06  (2006.01)
  F16B 35/04  (2006.01)
(52) U.S. Cl.
  USPC ............. 411/107; 411/34; 411/103; 411/113; 411/372; 411/413; 411/998

(58) Field of Classification Search
  USPC ............ 411/107, 180, 183, 34, 49, 969, 235, 411/367, 366.3, 371.1, 372, 998, 413, 375, 411/430, 103, 111, 113, 108
  See application file for complete search history.

(56) References Cited

U.S. PATENT DOCUMENTS
217,692 A  *  7/1879  Kator ............................ 411/133
1,346,058 A     7/1920  Robergel
(Continued)

FOREIGN PATENT DOCUMENTS
EP    1 016 796 A2    7/2000
EP    1 598 567 A1    11/2005
(Continued)

OTHER PUBLICATIONS

USS Dual Phase 80 (Specially HEat-Treated High-Strength Steel), Engineering Alloys Digest, Dec. 1978 (provided by ASM International).*

(Continued)

Primary Examiner — Victor Batson
Assistant Examiner — Tyler Johnson
(74) Attorney, Agent, or Firm — Hahn, Loeser & Parks LLP; Arland T. Stein

(57) ABSTRACT

An insert for blind installation in a workpiece, and method of manufacture of an insert, the insert (2) comprising a body (4) and anchor stud (6); wherein the stud is inserted into a through bore (22) in the body, part of the stud extending beyond the end of the through bore, and a part of the stud provided with opposed areas of knurling (14, 16) such as threading, being enveloped by a reduced diameter section (24) of the body, such that crimping the stud onto the body causes material to enter the knurling, thereby firmly attaching body and stud, allowing the insert to withstand high torque.

20 Claims, 3 Drawing Sheets

U.S. PATENT DOCUMENTS

| | | | | |
|---|---|---|---|---|
| 2,019,049 | A * | 10/1935 | Hoke | 411/425 |
| 2,024,071 | A * | 12/1935 | Taylor et al. | 411/424 |
| 2,056,688 | A * | 10/1936 | Peterka et al. | 411/399 |
| 2,405,613 | A * | 8/1946 | Shaff | 72/114 |
| 3,198,231 | A * | 8/1965 | Bisbing | 411/109 |
| 3,252,495 | A * | 5/1966 | Waltermire | 411/176 |
| 3,270,610 | A * | 9/1966 | Knowlton | 411/427 |
| 3,455,587 | A * | 7/1969 | Gallois | 403/408.1 |
| 3,560,132 | A * | 2/1971 | Gulistan | 411/361 |
| 3,571,904 | A * | 3/1971 | Gulistan | 29/443 |
| D221,376 | S * | 8/1971 | Tildesley | D8/385 |
| 3,727,254 | A * | 4/1973 | Tildesley | 470/21 |
| 4,018,132 | A * | 4/1977 | Abe | 411/413 |
| 4,143,579 | A * | 3/1979 | Ziaylek, Jr. | 411/42 |
| 4,621,963 | A * | 11/1986 | Reinwall | 411/369 |
| 4,827,756 | A * | 5/1989 | Crigger | 72/377 |
| 4,842,462 | A * | 6/1989 | Tildesley | 411/180 |
| 4,846,611 | A * | 7/1989 | Sadri et al. | 411/43 |
| 4,941,788 | A * | 7/1990 | Highfield | 411/178 |
| 4,969,785 | A * | 11/1990 | Wright | 411/43 |
| D323,287 | S * | 1/1992 | Brunetti | D8/385 |
| D323,288 | S * | 1/1992 | Brunetti | D8/385 |
| 5,096,349 | A * | 3/1992 | Landy et al. | 411/108 |
| 5,238,344 | A * | 8/1993 | Nagayama | 411/183 |
| 5,266,258 | A * | 11/1993 | Martin | 264/249 |
| RE34,928 | E * | 5/1995 | Highfield | 411/178 |
| 5,478,975 | A * | 12/1995 | Ford | 177/210 FP |
| 5,503,510 | A * | 4/1996 | Golan | 411/43 |
| 5,503,596 | A * | 4/1996 | Nagayama | 470/25 |
| 5,618,144 | A * | 4/1997 | Leistner | 411/427 |
| 5,645,386 | A * | 7/1997 | Damm et al. | 411/412 |
| 5,993,320 | A * | 11/1999 | Selle | 470/26 |
| 6,042,314 | A * | 3/2000 | Guelck | 411/399 |
| 6,079,920 | A * | 6/2000 | Dispenza | 411/107 |
| 6,109,849 | A * | 8/2000 | Nagayama | 411/181 |
| D442,064 | S * | 5/2001 | Chung | D8/356 |
| 6,264,414 | B1 * | 7/2001 | Hartmann et al. | 411/411 |
| 6,341,917 | B1 * | 1/2002 | Schubring et al. | 403/296 |
| 6,474,918 | B1 * | 11/2002 | Kelch | 411/180 |
| 6,537,007 | B1 * | 3/2003 | Kawatani et al. | 411/180 |
| 6,558,096 | B2 * | 5/2003 | Kelch | 411/180 |
| 6,612,794 | B2 * | 9/2003 | Kawatani et al. | 411/107 |
| 6,672,791 | B2 * | 1/2004 | Schubring et al. | 403/296 |
| 6,692,207 | B1 * | 2/2004 | Bailey | 411/180 |
| 6,854,943 | B2 * | 2/2005 | Nagayama | 411/429 |
| 7,029,217 | B2 * | 4/2006 | Kawatani et al. | 411/107 |
| 7,153,075 | B2 * | 12/2006 | Sommer et al. | 411/412 |
| 7,172,379 | B2 * | 2/2007 | Kawatani et al. | 411/107 |
| 7,189,163 | B2 * | 3/2007 | Nagayama | 470/25 |
| 7,306,418 | B2 * | 12/2007 | Kornblum | 411/352 |
| 7,402,016 | B2 * | 7/2008 | Yin-Feng | 411/413 |
| 7,419,343 | B2 * | 9/2008 | Nagayama | 411/179 |
| 7,938,608 | B1 * | 5/2011 | Jordan | 411/187 |
| 2003/0068214 | A1 * | 4/2003 | Sommer et al. | 411/533 |
| 2003/0118421 | A1 * | 6/2003 | Kawatani et al. | 411/107 |
| 2004/0001744 | A1 * | 1/2004 | Kawatani et al. | 411/180 |
| 2004/0115026 | A1 * | 6/2004 | Sommer et al. | 411/180 |
| 2011/0038685 | A1 * | 2/2011 | Christ et al. | 411/82 |
| 2011/0116889 | A1 * | 5/2011 | Lin et al. | 411/103 |

FOREIGN PATENT DOCUMENTS

| | | |
|---|---|---|
| JP | 2000-234610 | 8/2000 |
| WO | 86/05560 A1 | 9/1986 |

OTHER PUBLICATIONS

Combined Search and Examination Report which issued in connection with corresponding Great Britain Application No. GB0625438.7 on Feb. 15, 2007.

English Abstract of JP2000-234610.

* cited by examiner

BLIND STUD INSERT

RELATED/PRIORITY APPLICATION

This application is a National Phase filing regarding International Application No. PCT/GB2007/004275, filed on Nov. 9, 2007. International Application No. PCT/GB2007/004275 relies upon British Application No. 0625438.7, filed on Dec. 20, 2006 for priority.

BACKGROUND AND SUMMARY OF THE DISCLOSURE

This invention relates to blind stud inserts and particularly to the manufacture and assembly of an insert body and an anchor stud.

The invention relates to a method of manufacturing a blind stud insert from metal, which insert can be inserted through a workpiece and radially expanded to secure it to the workpiece. In this context, "blind" means that the insert can be installed by access to one side only of the workpiece.

It is known to provide a threaded insert body which is screwed then staked onto an anchor stud. However, the production and assembly of this type of insert involves many steps, including heat treatment of the anchor stud, roll tapping, washing and spinning of the body onto the anchor stud, and staking of the body onto the anchor stud. The heat treatment of the anchor stud must render the threaded shank sufficiently hard to enable it to withstand the force of the staking stage.

The rate of assembly of the above inserts is limited by the time-consuming processes of roll-tapping and of spinning of the body onto the anchor stud, with the time taken for this latter process increasing with the length of the anchor stud. A problem may also occur with cross threading between the body and the anchor stud threads, thus further increasing assembly time.

It is also known to provide an unthreaded body, which is staked directly onto the anchor stud. Although this embodiment does not suffer from the disadvantage of time-consuming spin-on, it has been found that stud retention is poor as the grip between the body and the threaded shank of the anchor stud is insufficient.

Another prior art insert, as disclosed in EP1598567 (Böllhoff) involves crimping an unthreaded body onto an anchor stud which is provided with longitudinal grooves superimposed over a helical thread form. This design compromises the torsional strength of the threaded shank of the anchor stud in the grooved region. The effective area of interlocking between the grooved thread crests of the anchor stud and the displaced material of the body is relatively small and consequently problems of adhesion between the body and anchor stud could still occur with this embodiment. When a high torque is applied to the insert, it is possible that the body and anchor stud can become separated. High torque could be applied, for example, on installation of the fastener, or when cross-threading occurs between the nut being assembled and the installed anchor stud to form the final joint and as a result the stud unscrews from the body. It is also possible that the body and anchor stud can become separated as a result of axial forces applied to the workpiece into which the insert has been installed.

The final joint may need to be undone and re-assembled in-service. Removal and re-tightening of the nut, especially if corroded, will apply torque loads to the stud in both directions of rotation and may also cause separation of the stud with the body.

After installation of an insert, it may become necessary to remove it from the workpiece into which it has been installed, for example for disassembly of the workpiece for end-of-life recycling. Inserts must therefore also be able to withstand the axial force necessary to force the insert out of a workpiece in either direction, without the anchor stud and body becoming separated.

It is an aim of the present invention to overcome or at least mitigate the aforementioned problems.

Accordingly the present invention provides, in one aspect, an insert for blind installation in a workpiece comprising a body and an anchor stud; the anchor stud having an elongate portion and a head located at or near one end of the elongate portion and extending radially therefrom; the anchor stud being insertable into a through bore extending throughout the interior of the body, such that when inserted, a first section of the elongate portion is enveloped by a reduced diameter section of the body, and a second section of the elongate portion, remote from the head, extends beyond an end of the through bore; wherein the first section of the elongate portion is provided with at least two areas of opposing angled knurling.

An advantage of the present invention is that during the crimping stage of the assembly of the insert, material is caused to enter the interstices of the anchor stud knurling, thus firmly holding the body onto the anchor stud. Therefore the insert can withstand the application of torque without allowing the anchor stud to become separated form the body. The provision of two areas of opposing angled knurling enables the insert to cope with such torque in either direction. The application of torque has no net effect in terms of generating axial movement in either direction even when the frictional force has been overcome. If two areas of knurling were provided with like angling, the effect would be similar to that of a steep helix or helical thread, i.e. the application of torque will produce a tendency for axial movement in one direction once the frictional forces have been overcome.

Preferably the insert is provided with one or more annular grooves in the first section of the anchor stud, i.e. the section which is enveloped by the body. More preferably, an annular groove is provided between the two knurled areas. An advantage of providing annular grooves is that during the crimping stage of the assembly of the insert, material from the body is also caused to flow into the annular grooves, thus acting to lock the body onto the head and resist axial forces applied to the insert, for example if it becomes necessary to remove the insert after installation.

Preferably, the anchor stud is made of dual-phase steel which has been work-hardened during cold forming and thread rolling operations, thus decreasing the cost and complexity of manufacture by eliminating the requirement for hardening and tempering of the stud. The use of dual-phase steel also eliminates the potential for hydrogen embrittlement caused by the hardening, tempering, and surface finishing processes, whilst ensuring that the anchor stud is sufficiently hard to cope with the forces encountered on crimping the body onto the anchor stud.

In an alternative embodiment, the body 4 could be of a different external cross-sectional form, such as square or hexagonal, to be inserted into a correspondingly shaped workpiece aperture. A body having a non-circular external cross-section would provide an advantage in terms of increased resistance to rotation of the body within the workpiece on application of torque to the stud.

The insert body could also be provided with exterior knurling 32, or underhead barbs 26a on the body flange, which embed in the workpiece to increase resistance to rotation on application of torque.

The invention provides, in a second aspect, a method of manufacture of an insert which method comprises steps of: forming an anchor stud and a body, wherein the anchor stud is formed with an elongate portion and a head located at or near one end of the elongate portion and extending radially therefrom; inserting the anchor stud into an unthreaded through bore extending throughout the body, such that areas of opposing angled knurls provided on a first section of the elongate portion are enveloped by a reduced diameter section of the body, and a second section of the elongate portion, remote from the head, extends beyond an end of the through bore; and crimping the reduced diameter section of the body enveloping the knurled areas of the anchor stud such that material of the body is forced into the interstices of the knurls.

An advantage of the method of manufacture of an insert according to the present invention is that subsequent to the forming of the anchor stud and body, the assembly of these two components to form the insert involves only two stages, i.e. inserting the anchor stud into the body, and crimping the body onto the anchor stud. Thus assembly of the insert is simplified as compared with the prior art methods which involve screwing the anchor stud into a threaded body, and the potential mode of failure by unscrewing of the two components is eliminated. Furthermore, the resulting adhesion of the parts is sufficient to cope with subsequent application of torque to the insert, in either direction. Therefore the likelihood of the insert body becoming separated from the anchor stud on application of high torque applied to the insert is significantly reduced.

A further advantage of crimping the body onto the anchor stud is that any corrosion-resistant plating or coating which has been applied to the body or anchor stud prior to assembly is not significantly affected.

The invention provides, in a further aspect, an insert for blind installation in a workpiece comprising a body and an anchor stud; the anchor stud having an elongate portion and a head located at or near one end of the elongate portion and extending radially therefrom; the anchor stud being insertable into a through bore extending throughout the interior of the body, such that the elongate portion has a first section which is enveloped by a reduced diameter section of the body, and a second section, remote from the head, which extends beyond an end of the through bore; wherein the elongate portion is provided with threading extending from part of the first section to at least part of the second section, whereby the threading extending into the second section acts as a first area of knurling, and wherein the first portion is provided with at least a second area of knurling at an opposing angle to the pitch of the threading.

An advantage of providing a threaded anchor stud wherein the threading extends into the first section of the stud, i.e. into the region onto which the body is subsequently crimped, is that the threading may act as an area of knurling, wherein body material will be forced into the threading on crimping as in the first embodiment.

BRIEF DESCRIPTION OF THE DRAWINGS

Embodiments of the invention will now be described by way of example and with reference to the accompanying drawings in which.

DETAILED DESCRIPTION OF THE DRAWINGS

Figure 1:
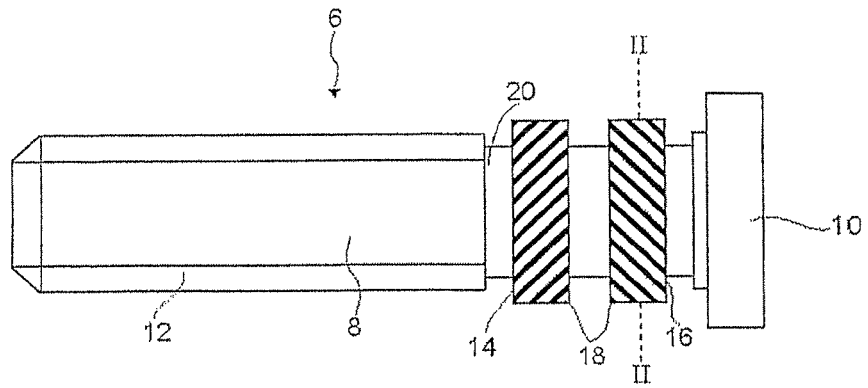
FIG. 1 is an elevation of an anchor stud in accordance with the present invention.
Figure 2:
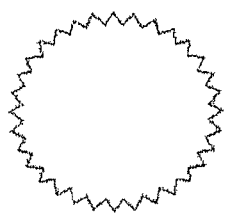
FIG. 2 is an axial cross-section of the anchor stud of FIG. 1 along the line II-II.
Figure 3:
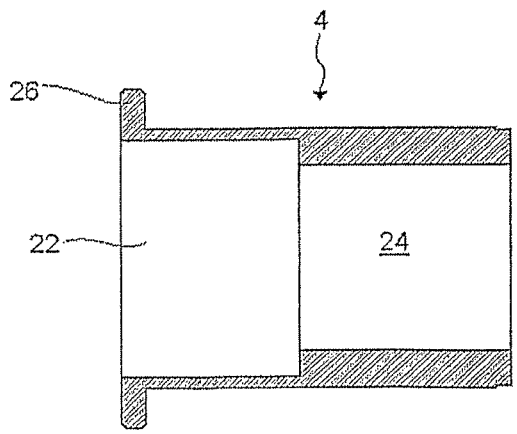
FIG. 3 is a cross-section of an insert body in accordance with the present invention.

Referring to FIGS. 1 to 4, the insert 2 comprises a body 4 and a dual-phase steel anchor stud 6. The anchor stud 6 comprises an elongate section 8 having a radially extending head 10 at one end. The elongate section 8 is provided with a threaded portion 12, and two knurled areas 14 and 16 between the threaded portion 12 and the head 10. The knurled areas 14 and 16 are formed of a plurality of angled knurls 18, wherein the knurls 18 of the first knurled area 14 are in an opposing direction to the knurls 18 of the second knurled area 16. Each knurl 18 is formed of a triangular-shaped crest, as illustrated in FIG. 2. Annular grooves 20 are provided on the anchor stud 6, between the head 10 and the first knurled area 14, between the first knurled area 14 and the second knurled area 16, and between the second knurled area 16 and the threaded portion 12.

The body 4 has a through bore 22 of circular cross-section extending throughout. The through bore 22 has a portion of reduced diameter 24 at one end of the body. The other end of the body is provided with a radially extending flange 26.

Figure 4:
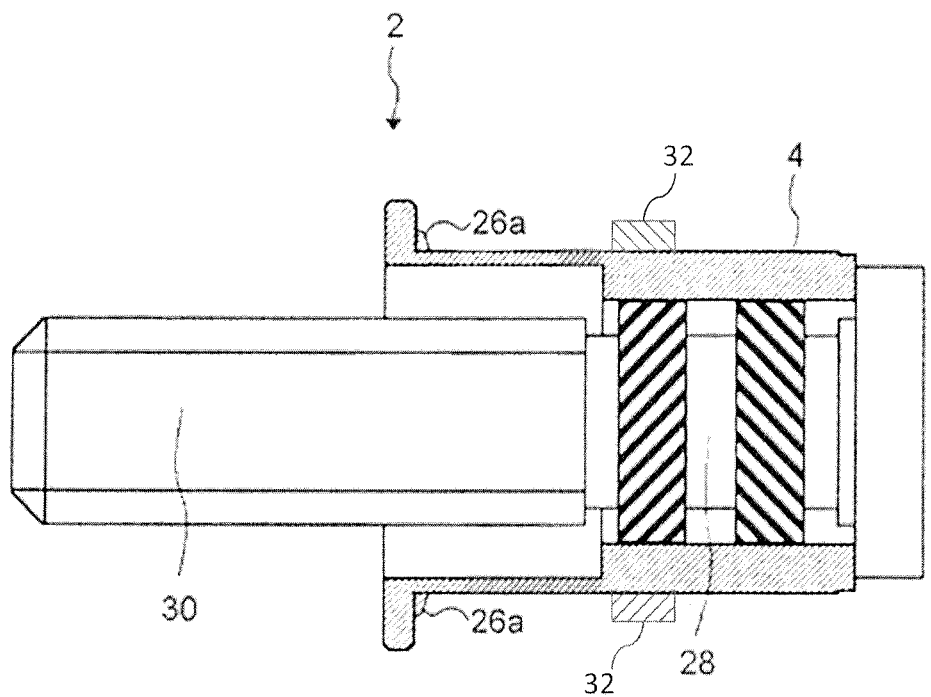
FIG. 4 is an elevation of the anchor stud of FIG. 1 inserted into the cross-sectional insert body of FIG. 2.

As shown in FIG. 4, the first stage of assembly of the insert 2 is the insertion of the anchor stud 6 into the body 4, until the anchor stud head 10 abuts against surface of the body 4. Once the anchor stud 6 is fully inserted into the body 4, a first section 28 of the anchor stud, which includes the knurled areas 14 and 16, is enveloped by the portion of reduced diameter 24 of the body 4. The dimensions of the knurled areas 14 and 16 and the portion of reduced diameter 24 of the through bore 22 are such that a light interference fit is achieved between the anchor stud 6 and the body 4. A second section 30 of the anchor stud extends beyond the end of the body 4.

Figure 5:
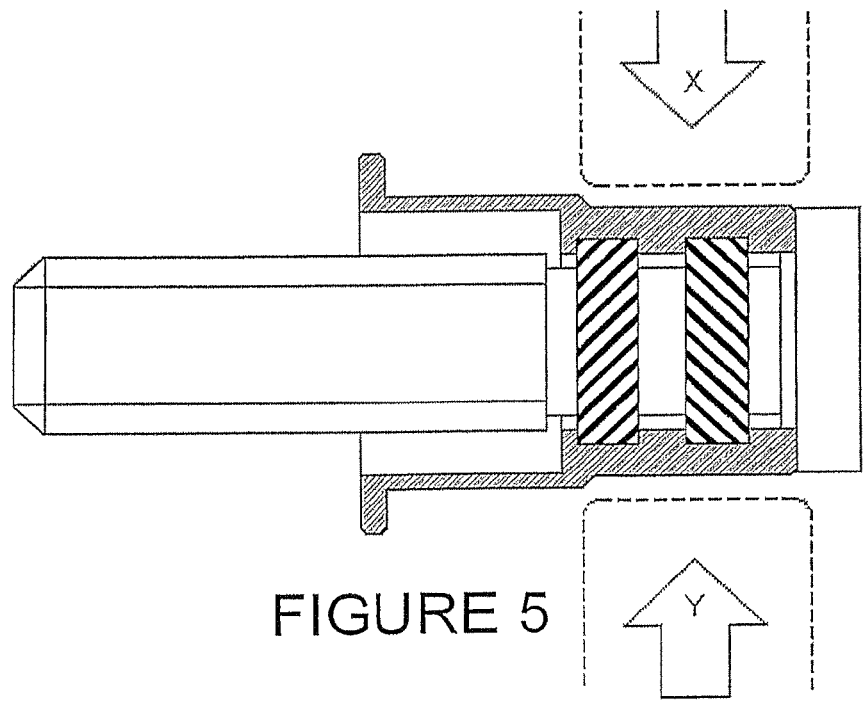
FIG. 5 is a schematic representation of the crimping of the cross-sectional insert body of FIG. 2 onto the anchor stud of FIG. 1.

The next stage of assembly of the insert, as shown in FIG. 5, is the crimping of the body 4 onto the anchor stud 6. Crimping is performed by a four jaw crimping head (not shown) acting at four equally spaced points around the exterior part of the body 4 corresponding approximately to the reduced diameter section 24 of the through bore 22. Two of these points are indicated by arrows X and Y. Crimping causes the material under each jaw to deform, i.e. to enter the annular grooves 20 and the interstices of the angled knurls 18. The crimp involves a high load which is applied over a relatively large area; the four crimp jaws act upon most of the circumference of the body.

The surfaces of the jaws of the crimping head which are forced onto the body 4 have a flat surface, thus allowing a small degree of flexibility in the placing of the insert within the crimping head. Alternatively, the surfaces of the jaws could have a profile corresponding to that of the first section of the anchor stud 6, i.e. to aid the forcing of the body material into the knurl interstices and the annular grooves.

Figure 6:
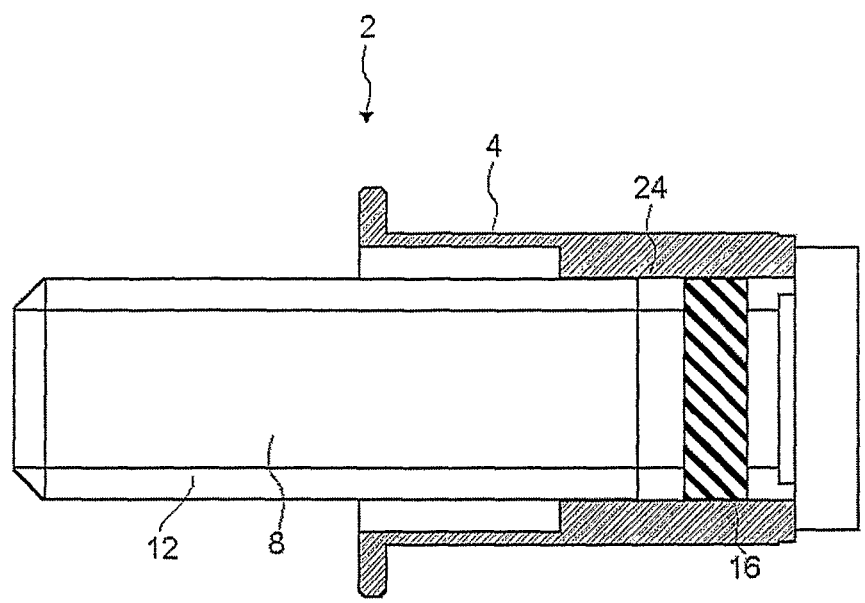
FIG. 6 is an elevation of an alternative embodiment of an anchor stud in accordance with the invention inserted into a cross-sectional insert body.

In a further alternative embodiment, the threaded portion 12 of the elongate section 8 of the anchor stud 6 could be extended into the reduced-diameter section 24 of the body 4 sufficiently that it can be used as a first area of knurling. The second area of knurling in this embodiment could comprise knurls at an opposing angle to the pitch of the thread. FIG. 6 illustrates this embodiment prior to crimping of the insert body onto the anchor stud.

The invention claimed is:

1. An insert for blind installation in a workpiece, the insert comprising:
   an anchor stud having:
      a head portion extending radially from the anchor stud and an elongated portion extending axially from the head portion;
      the elongated portion comprising a first section adjacent the head portion and a second section extending from the first section removed from the head portion, the first section having two areas of angled knurling formed in opposing directions; and
   a radially expandable insert body surrounding at least a portion of the elongated portion of the anchor stud, the insert body having a reduced diameter section engaging the two areas of angled knurling of the anchor stud joining the anchor stud and the insert body.

2. The insert as claimed in claim 1, where the second section of the elongated portion is threaded.

3. The insert as claimed in claim 1, where at least a portion of the reduced diameter section of the insert body is crimped such that a portion of the insert body is deformed into at least a portion of the two areas of angled knurling.

4. The insert as claimed in claim 1, the anchor stud further comprising an annular groove between the two areas of opposing angled knurling of the first section of the elongated portion.

5. The insert as claimed in claim 1, the anchor stud further comprising an annular groove between the first section of the elongated portion and the second section of the elongated portion.

6. The insert as claimed in claim 1, the anchor stud further comprising an annular groove between the first section of the elongated portion and the head portion.

7. The insert as claimed in claim 1, where the anchor stud is made of dual-phase steel.

8. The insert as claimed in claim 1, where the insert body has a non-circular external cross-section.

9. The insert as claimed in claim 1, where the insert body has a circular internal cross-section.

10. The insert as claimed in claim 1, where the reduced diameter section of the insert body is provided adjacent one end of the insert body.

11. The insert as claimed in claim 1, the insert body further comprising a radially extending flange adjacent an end of the insert body opposite from the reduced diameter section.

12. The insert as claimed in claim 1, where the insert body comprises knurling on at least a portion of an external surface of the insert body adapted to engage a workpiece.

13. The insert as claimed in claim 1, where the body is provided with underhead barbs adapted to engage a workpiece.

14. An insert for blind installation in a workpiece, the insert comprising:
   an anchor stud having:
      a head portion extending radially from the anchor stud and an elongated portion extending axially from the head portion;
      the elongated portion comprising a first section adjacent the head portion and a second section extending from the first section removed from the head portion, where the elongated portion is threaded over at least a part of the first section and a part of the second section, and where the first section further includes an area of knurling at an opposing angle to the pitch of the threading; and
   a radially expandable insert body surrounding at least a portion of the elongated portion of the anchor stud, the insert body having a reduced diameter section engaging at least the threaded portion of the first section and the area of knurling of the first section of the elongated portion joining the anchor stud and the insert body.

15. The insert as claimed in claim 14, where at least a portion of the reduced diameter section of the insert body is crimped such that a portion of the insert body is deformed into at least a portion of the threads of the threaded portion of the first section and at least a portion of the area of knurling of the first section of the elongated portion.

16. The insert as claimed in claim 14, the anchor stud further comprising an annular groove between the threaded portion of the first section and the area of knurling of the first section of the elongated portion.

17. The insert as claimed in claim 14, where the insert body has a non-circular external cross-section.

18. The insert as claimed in claim 14, where the insert body has a circular internal cross-section.

19. The insert as claimed in claim 14, where the reduced diameter section of the insert body is provided adjacent one end of the insert body.

20. The insert as claimed in claim 14, the insert body further comprising a radially extending flange adjacent an end of the insert body opposite from the reduced diameter section.

* * * * *

UNITED STATES PATENT AND TRADEMARK OFFICE
CERTIFICATE OF CORRECTION

PATENT NO. : 8,444,356 B2  
APPLICATION NO. : 12/517687  
DATED : May 21, 2013  
INVENTOR(S) : Crutchley et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 327 days.

Signed and Sealed this
Eighth Day of September, 2015

Michelle K. Lee
*Director of the United States Patent and Trademark Office*